United States Patent
Noh et al.

(10) Patent No.: US 12,401,031 B2
(45) Date of Patent: Aug. 26, 2025

(54) CATHODE ACTIVE MATERIAL FOR LITHIUM SECONDARY BATTERY AND LITHIUM SECONDARY BATTERY INCLUDING THE SAME

(71) Applicant: SK INNOVATION CO., LTD., Seoul (KR)

(72) Inventors: Mi Jung Noh, Daejeon (KR); Jik Soo Kim, Daejeon (KR); Jae Ho Choi, Daejeon (KR); Tae Kyoung Lee, Daejeon (KR); Sang Bok Kim, Daejeon (KR); Sang Min Park, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 17/512,548

(22) Filed: Oct. 27, 2021

(65) Prior Publication Data
US 2022/0310997 A1    Sep. 29, 2022

(30) Foreign Application Priority Data
Mar. 25, 2021 (KR) .................... 10-2021-0038992

(51) Int. Cl.
*H01M 4/52* (2010.01)
*C01G 53/66* (2025.01)
(Continued)

(52) U.S. Cl.
CPC ............ *H01M 4/525* (2013.01); *C01G 53/66* (2013.01); *H01M 4/505* (2013.01);
(Continued)

(58) Field of Classification Search
None
See application file for complete search history.

(56) References Cited

U.S. PATENT DOCUMENTS

2002/0071990 A1* 6/2002 Kweon ............. C01G 45/1228
427/126.6
2008/0090150 A1   4/2008 Nakura
(Continued)

FOREIGN PATENT DOCUMENTS

CN    103441255 A    12/2013
CN    105070907 A    11/2015
(Continued)

OTHER PUBLICATIONS

Savina A A et al., Sulfate-Containing Composite Based on Ni-Rich Layered Oxide LiNi0.8Mn0.1Co0.1O2 as High-Performance Cathode Material for Li-ion Batteries, Nanomaterials, Nov. 29, 2020, vol. 10, MDPI.

(Continued)

*Primary Examiner* — Barbara L Gilliam
*Assistant Examiner* — Angela J Martin
(74) *Attorney, Agent, or Firm* — IP & T GROUP LLP (57) ABSTRACT

A cathode active material for a lithium secondary battery according to embodiments of the present invention has a high-nickel composition and includes a lithium-nickel composite metal oxide particle in which lithium, nickel and a metal having an oxidation number of +2 are combined in a predetermined range. A cation disorder caused when a nickel ion is present at a lithium-ion site is reduced to improve structural stability of the cathode active material. An initial capacity and a battery efficiency of a lithium secondary battery can be improved using the cathode active material.

7 Claims, 5 Drawing Sheets

(51) Int. Cl.
*H01M 4/50* (2010.01)
*H01M 4/505* (2010.01)
*H01M 4/525* (2010.01)
*H01M 10/05* (2010.01)
*H01M 10/0525* (2010.01)
*H01M 4/02* (2006.01)

(52) U.S. Cl.
CPC ..... *H01M 10/0525* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 2008/0248392 A1 | 10/2008 | Takeuchi et al. | |
| 2018/0316005 A1 | 11/2018 | Shin et al. | |
| 2020/0083523 A1* | 3/2020 | Hamano | H01M 4/505 |

FOREIGN PATENT DOCUMENTS

| | | |
|---|---|---|
| CN | 109244436 A | 1/2019 |
| CN | 109802132 A | 5/2019 |
| CN | 110137488 A | 8/2019 |
| CN | 112382741 A | 2/2021 |
| CN | 112510181 A | 3/2021 |
| EP | 1195825 A2 | 4/2002 |
| EP | 3992149 A1 | 5/2022 |
| JP | 2011-060541 A | 3/2011 |
| JP | 2013254639 * | 12/2013 .......... H01M 10/052 |
| JP | 2021-022576 A | 2/2021 |
| KR | 10-0821523 B1 | 4/2008 |
| KR | 10-2008-0086829 A | 9/2008 |
| KR | 10-1469436 B1 | 12/2014 |
| KR | 10-2017-0119691 A | 10/2017 |
| KR | 10-2018-0121267 A | 11/2018 |
| KR | 10-2019-0113607 A | 10/2019 |
| KR | 10-2133916 B1 | 7/2020 |

OTHER PUBLICATIONS

Extended European Search Report for European Patent Application No. 22163720.0 issued by the European Patent Office on Aug. 10, 2022.
Extended European Search Report issued by the European Patent Office on Apr. 14, 2022.
Office Action issued by the Chinese Patent Office on Apr. 18, 2022.
Notice of Allowance for the Chinese Patent Application No. 202111254637.X issued by the United States Patent and Trademark Office on Nov. 4, 2022.

* cited by examiner

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Applications No. 10-2021-0038992 filed on Mar. 25, 2021 in the Korean Intellectual Property Office (KIPO), the entire disclosure of which is incorporated by reference herein.

BACKGROUND

1. Field

The present invention relates to a cathode active material for a lithium secondary battery and a lithium secondary battery including the same. More particularly, the present invention relates to a cathode active material for a lithium secondary battery having an improved structural stability and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, the secondary battery or a battery pack including the same is being developed and applied as an eco-friendly power source of an electric automobile such as a hybrid vehicle.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer, and an electrolyte immersing the electrode assembly. The lithium secondary battery may further include an outer case having, e.g., a pouch shape.

As an application of the lithium secondary battery has been expanded to a large-scaled device such as the hybrid vehicle, a high-nickel lithium oxide having an increased content of nickel is developed as a cathode active material for obtaining a high capacity of the lithium secondary battery.

However, in the conventional high-nickel lithium oxide, a nickel-ion may be present at a lithium-ion site to cause a cation disorder, and life-span and structural stability of the lithium secondary battery may be degraded.

For example, Korean Registered Patent Publication No. 10-0821523 discloses a cathode active material including a high-nickel composite oxide, which may not provide sufficient life-span and structural stability as mentioned above.

SUMMARY

According to an aspect of the present invention, there is provided a cathode active material for a lithium secondary battery having improved structural stability and electrical property.

According to an aspect of the present invention, there is provided a lithium secondary battery having improved structural stability and electrical property.

According to exemplary embodiments, a cathode active material for a lithium secondary battery includes a lithium-nickel composite metal oxide particle represented by Chemical Formula 1.

[Chemical Formula 1]

In Chemical Formula 1, $0 < a \leq 1.1$, $1.98 \leq b \leq 2.2$, $0.8 \leq x \leq 0.98$, y is a molar ratio of M1 corresponding to a weight greater than 0 wt % and 2.5 wt % or less of a weight of Ni, and M1 is at least one element having an oxidation number of +2, and M2 is at least one element having a positive oxidation number excluding +2.

In some embodiments, a weight ratio of M1 may be from 0.01 wt % to 1.4 wt % based on the weight of Ni.

In some embodiments, in Chemical Formula 1, M1 may be at least one element selected from the group consisting of Be, Mg, Ca, Sr, Ba and Ra.

In some embodiments, in Chemical Formula 1, $0.0002 \leq y \leq 0.02$.

In some embodiments, in Chemical Formula 1, $0.001 \leq y \leq 0.01$.

In some embodiments, in Chemical Formula 1, M2 may include at least one element having an oxidation number of +3 or more.

In some embodiments, in Chemical Formula 1, M2 may be at least one element selected from the group consisting of B, Al, Si, Ti, V, Mn, Fe, Co, Cu, Zn, Y, Zr, Mo, Sn and W.

In some embodiments, in Chemical Formula 1, M2 may include Co and Mn.

In some embodiments, the cathode active material may further include at least one of a metal sulfate component, a metal carbonate component and a metal oxide component.

In some embodiments, the metal sulfate component, the metal carbonate component and the metal oxide component may each contain M1 of Chemical Formula 1.

In some embodiments, M1 may be at least one element selected from the group consisting of Be, Mg, Ca, Sr, Ba and Ra.

In some embodiments, the lithium-nickel composite metal oxide particle may have a secondary particle structure in which a plurality of primary particles are aggregated, and the metal sulfate component, the metal carbonate component or the metal oxide component may be present between the primary particles.

In some embodiments, in Chemical Formula 1, $0.8 \leq x \leq 0.95$.

According to exemplary embodiments, a lithium secondary battery includes a cathode including the cathode active material layer for a lithium secondary battery according to embodiments as described above, and an anode facing the cathode.

A cathode active material for a lithium secondary battery according to the embodiments of the present invention has a high-nickel composition and includes a lithium-nickel composite metal oxide particle in which lithium, nickel, a transition metal and at least two elements having an oxidation number of +2 are combined in a predetermined range. In this case, a cation disorder caused when a nickel-ion is present at a lithium-ion site may be suppressed so that degradation of stability and performance caused by a lithium residue may be prevented. Accordingly, structural stability of the cathode active material may be improved, and an initial capacity and efficiency of the lithium secondary battery may be enhanced.

In some embodiments, the cathode active material for a lithium secondary battery may further include a metal sulfate component. The metal sulfate component may serve as a binder of primary particles included in the lithium-nickel composite metal oxide particle. Accordingly, chemical and structural stability of the cathode active material may be improved, thereby further improving life-span of the lithium secondary battery.

DETAILED DESCRIPTION OF THE EMBODIMENTS

According to embodiments of the present invention, a cathode active material including a lithium-nickel composite metal oxide particle that includes lithium, a high content of nickel and other metal elements is provided. According to embodiments of the present invention, a lithium secondary battery including the cathode active material is also provided.

Hereinafter, embodiments of the present invention will be described in detail. However, the embodiments disclosed herein are exemplary and the present invention is not limited to a specific embodiment.

The term "excess amount" used herein refers to being included in the largest content or molar ratio among metals other than lithium. The term "content" or "concentration" used herein may mean a molar ratio in a lithium metal oxide.

In exemplary embodiments, the cathode active material for a lithium secondary battery may include lithium-nickel composite metal oxide particles represented by Chemical Formula 1 below.

$$Li_aNi_xM1_yM2_{1-x}O_b$$ [Chemical Formula 1]

In Chemical Formula 1, $0<a\leq1.1$, $1.98\leq b\leq2.2$, and $0.8\leq x\leq0.98$. y is a molar ratio corresponding to a weight of M1 greater than 0% and less than 2.5% of a weight of Ni. M1 is at least one element having an oxidation number of +2, and M2 is at least one element having a positive oxidation number excluding an oxidation number of +2.

In some embodiments, a molar ratio or concentration (x) of Ni in Chemical Formula 1 may be 0.8 or more and 0.98 or less. If the concentration of Ni is less than about 0.8, a lithium secondary battery having sufficiently high capacity may not be realized. Further, the effect of increasing capacity from an insertion of M1, which will be described later, may not be substantially implemented.

If the concentration of Ni exceeds about 0.98, stability of the cathode active material may be excessively degraded, which may result in reduced life-span and mechanical instability.

In a preferable embodiment, the concentration or molar ratio of Ni may be 0.8 to 0.95, or 0.8 to 0.9.

For example, Ni may serve as a metal related with the capacity of the lithium secondary battery. Accordingly, as described above, the lithium-nickel composite metal oxide particle having the high-Ni composition may be employed so that the cathode and the lithium secondary battery having high capacity may be provided while also providing high power.

In some embodiments, in Chemical Formula 1, M2 is at least one element selected from the group consisting of B, Al, Si, Ti, V, Mn, Fe, Co, Cu, Zn, Y, Zr, Mo, Sn and W.

In some embodiments, M2 may include Co and Mn. In an embodiment, M2 may further include Al.

As described above, as the content of Ni increases, the capacity of the lithium secondary battery may be improved, but the high-Ni content may be disadvantageous from an aspect of life-span properties, and mechanical and electrical stability. For example, if the content of Ni is excessively increased, defects such as ignition and short circuit may not be sufficiently suppressed when penetration by an external object occurs.

In exemplary embodiments, chemical and mechanical instability caused by Ni may be compensated by distributing M2 together in the lithium-nickel composite metal oxide particle. For example, the defects such as ignition and short circuit occurring when the cathode is penetrated by the external object may be suppressed or reduced, and life-span of the lithium secondary battery may be enhanced.

Additionally, a conductivity of the lithium-nickel composite metal oxide particle may be improved using Co, and thus power of the battery may also be improved.

As described above, when the lithium-nickel composite metal oxide particle include Ni, Co, Mn, Al, etc., oxidation numbers of Co and Al may be fixed to +3, and an oxidation number of Mn may be fixed to +4.

The oxidation number of Ni may have a variable oxidation number from +2 to +4 depending on a synthesis condition and an operating environment of the secondary battery. As a ratio of Ni elements having the oxidation number of +2 increases, a cation disorder caused when Ni ions are present or transferred at Li-ion sites may easily occur, thereby deteriorating life-span and operational stability of the lithium secondary battery.

In exemplary embodiments, at least one M1 element having an oxidation number of +2 may be included to suppress transition or substitution of Ni having the oxidation number of +2 into lithium sites. Accordingly, generation of cation disorder may be suppressed, and life-span, stability and capacity retention of the battery may be improved.

In some embodiments, M1 may include a metal element having an element size similar to nickel and an oxidation number of +2. For example, M1 may include Be, Mg, Ca, Sr, Ba and/or Ra.

Preferably, M1 may include an element having an ionic radius greater than that of a lithium ion (e.g., Ca, Sr, Ba and Ra). In this case, a precipitation of the lithium ion may be prevented during a synthesis of the lithium-nickel composite metal oxide particle, and M1 may be precipitated on surfaces of primary particles in advance. Thus, a binder may be easily formed between the primary particles while suppressing generation of lithium impurities.

If M1 includes a plurality of elements, y may be a sum of molar ratios of the plurality of elements in Chemical Formula 1.

A content of M1 may be adjusted to an amount capable of suppressing or reducing cation defects of Ni. In some embodiments, the content of M1 in the cathode active material may be greater than 0 weight percent (wt %) and 2.5 wt % or less based on a weight of Ni.

If the content of M1 exceeds 2.5 wt %, an amount corresponding to the defect caused by Ni-ion substitutions into the lithium-ion sites may be exceeded, and an initial resistance of the lithium secondary battery may be increased and a discharge capacity may be reduced.

In a preferable embodiment, the content of M1 may be from 0.01 wt % to 1.4 wt %, more preferably from 0.01 wt % to 1 wt %, and further 0.1 wt % to 1 wt %.

In Chemical Formula 1, the molar ratio (y) of M1 may be adjusted to satisfy the above-described weight ratio of M1. In some embodiments, $0.0002 \leq y \leq 0.02$, preferably $0.001 \leq y \leq 0.01$, and more preferably $0.003 \leq y \leq 0.01$.

In some embodiments, the cathode active material for a lithium secondary battery may further include a metal sulfate component, a metal carbonate component and/or a metal oxide component.

In some embodiments, the metal sulfate component may be represented by $M1SO_4$, the metal carbonate component may be represented by $M1CO_3$, and the metal oxide component may be represented by $M1O$.

As described above, M1 may include Be, Mg, Ca, Sr, Ba and/or Ra.

In some embodiments, the lithium-nickel composite metal oxide particle may have a secondary particle structure formed by aggregation of primary particles. For example, the metal sulfate component, the metal carbonate component or the metal oxide component functions as a binder or a coagulant between the primary particles, and thus structural and chemical stability of the cathode active material of the lithium-nickel composite metal oxide particle may be further improved. Accordingly, stable capacity of the lithium secondary battery may be effectively provided.

For example, the metal sulfate component, the metal carbonate component or the metal oxide component may be present between the primary particles in an inner region of the lithium-nickel composite metal oxide particle.

Hereinafter, a method of manufacturing a cathode active material according to the above-described embodiments of the present invention is provided.

In exemplary embodiments, active material metal salts may be prepared. The active material metal salts may include a nickel salt, a manganese salt and a cobalt salt. In this case, M2 in Chemical Formula 1 may include Co and Mn.

Examples of the nickel salt include nickel sulfate ($NiSO_4$), nickel hydroxide ($Ni(OH)_2$), nickel nitrate ($Ni(NO_3)_2$), nickel acetate ($Ni(CH_3CO_2)_2$, a hydrate thereof, etc. Examples of the manganese salt include manganese sulfate ($MnSO_4$), manganese hydroxide ($Mn(OH)_2$), manganese nitrate ($Mn(NO_3)_2$), manganese acetate ($Mn(CH_3CO_2)_2$), a hydrate thereof, etc. Examples of the cobalt salt include cobalt sulfate ($CoSO_4$), cobalt hydroxide ($Co(OH)_2$), cobalt nitrate ($Co(NO_3)_2$), cobalt carbonate ($CoCO_3$), a hydrate thereof, etc.

Preferably, nickel sulfate, manganese sulfate and cobalt sulfate may be used as the nickel salt, the manganese salt and the cobalt salt, respectively. In this case, a sulfate remaining after preparation of an active material precursor and the M1 metal may react with each other to easily generate the metal sulfate component.

In some embodiments, boron (B), aluminum (Al), silicon (Si), titanium (Ti), vanadium (V), iron (Fe), copper (Cu), zinc (Zn), yttrium (Y), zirconium (Zr), molybdenum (Mo), tin (Sn), tungsten (W), a salt (e.g., hydroxide) or an oxide thereof may be used together.

In some embodiments, examples of a source of M1 having the oxidation number of +2 may include hydroxides and hydrates of Be, Mg, Ca, Sr, Ba and Ra such as beryllium hydroxide ($Be(OH)_2 \cdot XH_2O$), magnesium hydroxide ($Mg(OH)_2 \cdot XH_2O$), calcium hydroxide ($Ca(OH)_2 \cdot XH_2O$), strontium hydroxide ($Sr(OH)_2 \cdot XH_2O$), barium hydroxide ($Ba(OH)_2 \cdot XH_2O$), radium hydroxide ($Ra(OH)_2 \cdot XH_2O$), etc. Further, carbonates such as beryllium carbonate ($BeCO_3$), magnesium carbonate ($MgCO_3$), calcium carbonate ($CaCO_3$), strontium carbonate ($SrCO_3$), barium carbonate ($BaCO_3$), radium carbonate ($RaCO_3$), etc., may also be used. These may be used alone or in combination thereof.

In exemplary embodiments, the active material precursor may be obtained by mixing and reacting the active material metal salts as described above through, e.g., a co-precipitation method. For example, the active material precursor may be prepared in the form of nickel-manganese-cobalt hydroxide.

To promote the co-precipitation reaction, a precipitating agent and/or a chelating agent may be used. The precipitating agent may include an alkaline compound such as sodium hydroxide (NaOH), sodium carbonate ($Na_2CO_3$), etc. The chelating agent may include, e.g., aqueous ammonia (e.g., $NH_3H_2O$), ammonium carbonate (e.g., $NH_3HCO_3$), etc.

The active material precursor may be mixed with the above-described M1 source and a lithium source compound, and reacted by a heat treatment to prepare a lithium-nickel composite metal oxide particle. For example, a temperature of the heat treatment may be from about 600° C. to 850° C.

The lithium source compound may include, e.g., lithium carbonate ($Li_2CO_3$), lithium nitrate ($LiNO_3$), lithium acetate ($CH_3COOLi$), lithium oxide ($Li_2O$), lithium hydroxide (LiOH), etc. These may be used alone or in combination thereof.

Preferably, lithium hydroxide may be used as the lithium source compound.

In some embodiments, impurities such as LiOH and $Li_2CO_3$ may remain on a surface of the lithium-nickel composite metal oxide particle. The impurities may be removed by washing with an aqueous or organic solvent.

As described above, at least some of remaining M1 elements except for the M1 elements incorporated into the lithium-nickel composite metal oxide particle may capture impurities such as LiO, $Li_2CO_3$, etc., to produce a metal oxide component or a metal carbonate component. Accordingly, a cohesive force at an inside of the lithium-nickel composite metal oxide particle may be improved while reducing an amount of residual impurities.

Figure 1:
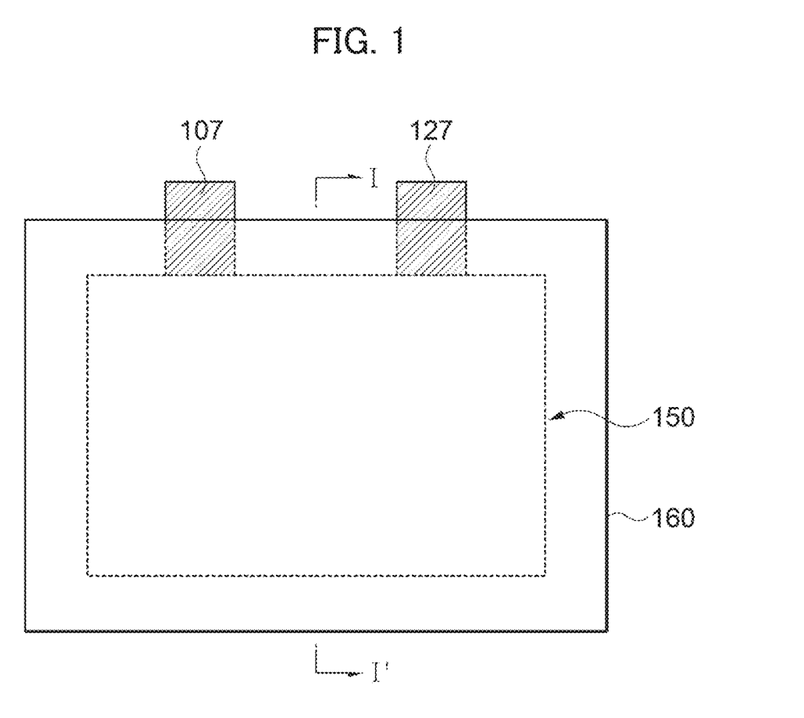
FIGS. 1 and 2 are schematic top planar view and cross-sectional view, respectively, illustrating a lithium secondary battery in accordance with exemplary embodiments.
Figure 2:
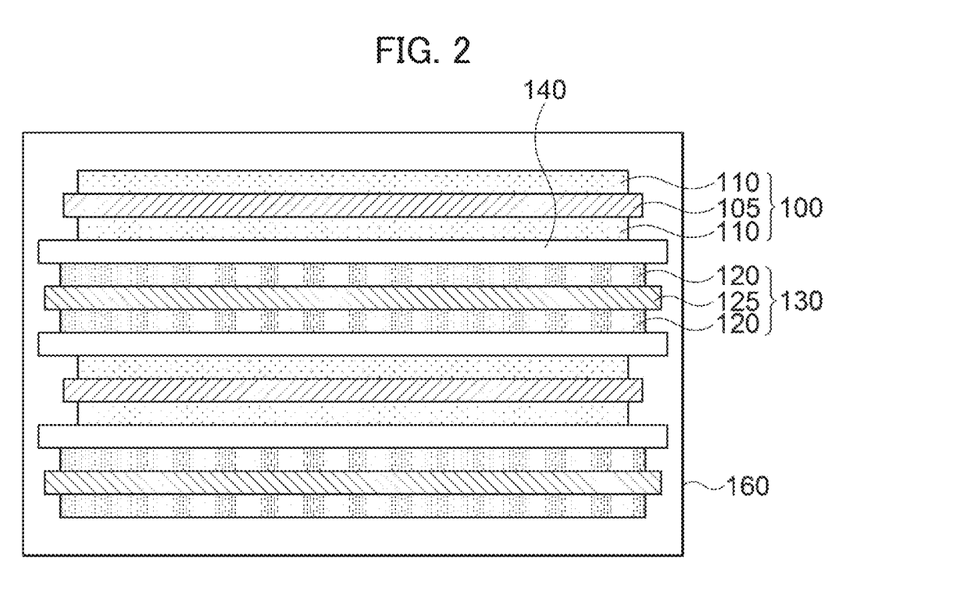

FIGS. 1 and 2 are a schematic top planar view and a schematic cross-sectional view, respectively, illustrating a lithium secondary battery in accordance with exemplary embodiments exemplary embodiments.

Hereinafter, a lithium secondary battery including a cathode including the cathode active material for a lithium secondary battery as described above is provided with reference to FIGS. 1 and 2.

Referring to FIGS. 1 and 2, a lithium secondary battery may include a cathode 100 including a cathode active material layer that includes the above-described cathode active material for a lithium secondary battery, and an anode 130 facing the cathode.

The cathode 100 may include a cathode active material layer 110 formed by applying the above-described cathode active material on a cathode current collector 105.

For example, a cathode slurry may be prepared by mixing and stirring the cathode active material as described above in a solvent with a binder, a conductive material and/or a dispersive agent. The cathode slurry may be coated on the cathode current collector 105, and then dried and pressed to form the cathode 100.

The cathode current collector 105 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may be added to facilitate electron mobility between active material particles. For example, the conductive agent may include a carbon-based material such as graphite, carbon black, graphene, carbon nanotube, etc., and/or a metal-based material such as tin, tin oxide, titanium oxide, a perovskite material such as LaSrCoO$_3$ or LaSrMnO$_3$, etc.

In exemplary embodiments, the anode 130 may include an anode current collector 125 and an anode active material layer 120 formed by coating an anode active material on the anode current collector 125.

The anode active material may include a material commonly used in the related art which may be capable of adsorbing and ejecting lithium ions. For example, a carbon-based material such as a crystalline carbon, an amorphous carbon, a carbon complex or a carbon fiber, a lithium alloy, silicon (Si)-based compound, tin, etc., may be used.

The amorphous carbon may include a hard carbon, cokes, a mesocarbon microbead (MCMB) fired at a temperature of 1,500° C. or less, a mesophase pitch-based carbon fiber (MPCF), etc. The crystalline carbon may include a graphite-based material such as natural graphite, graphitized cokes, graphitized MCMB, graphitized MPCF, etc. The lithium alloy may further include aluminum, zinc, bismuth, cadmium, antimony, silicon, lead, tin, gallium, indium, etc.

The anode current collector 125 may include, e.g., gold, stainless steel, nickel, aluminum, titanium, copper or an alloy thereof, preferably may include copper or a copper alloy.

For example, a slurry may be prepared by mixing and stirring the anode active material with a binder, a conductive material, a thickening agent in a solvent. The slurry may be coated on the anode current collector 125, and then dried and pressed to form the anode 130.

The binder and the conductive agent substantially the same as or similar to those mentioned above may also be used in the anode. In some embodiments, the binder for forming the anode may include, e.g., an aqueous binder such as styrene-butadiene rubber (SBR) for compatibility with the carbon-based active material, and may be used together with a thickener such as carboxymethyl cellulose (CMC).

A separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In exemplary embodiments, an electrode cell may be defined by the cathode 100, the anode 130 and the separation layer 140, and a plurality of the electrode cells may be stacked to form an electrode assembly 150 that may have e.g., a jelly roll shape. For example, the electrode assembly 150 may be formed by winding, laminating or folding the separation layer 140.

The electrode assembly 150 may be accommodated together with an electrolyte in an outer case 160 to define a lithium secondary battery. In exemplary embodiments, a non-aqueous electrolyte may be used as the electrolyte.

For example, the non-aqueous electrolyte solution may include a lithium salt and an organic solvent. The lithium salt and may be represented by Li$^+$X$^-$. An anion of the lithium salt X$^-$ may include, e.g., F$^-$, Cl$^-$, Br$^-$, I$^-$, NO$_3^-$, N(CN)$_2^-$, BF$_4^-$, ClO$_4^-$, PF$_6^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, (SF$_5$)$_3$C$^-$, (CF$_3$SO$_2$)$_3$C$^-$, CF$_3$(CF$_2$)$_7$SO$_3^-$, CF$_3$CO$_2^-$, CH$_3$CO$_2^-$, SCN$^-$, (CF$_3$CF$_2$SO$_2$)$_2$N$^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 2, electrode tabs (a cathode tab and an anode tab) may protrude from the cathode current collector 105 and the anode electrode current collector 125 included in each electrode cell to one side of the outer case 160. The electrode tabs may be welded together with the one side of the outer case 160 to form an electrode lead (a cathode lead 107 and an anode lead 127) extending or exposed to an outside of the outer case 160.

The lithium secondary battery may be manufactured in, e.g., a cylindrical shape using a can, a square shape, a pouch shape or a coin shape.

According to the above-described exemplary embodiments, the lithium-nickel composite metal oxide particle in which a high content of nickel is contained, and a nickel, a transition metal and at least one element having an oxidation number of +2 may be combined within a predetermined range. Thus, chemical stability of the cathode active material may be improved, and the lithium secondary battery with improved life-span and long-term stability is provided while suppressing a reduction of capacity and average voltage Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

(1) Preparation of Cathode Active Material

1) Examples and Comparative Examples

NiSO$_4$, CoSO$_4$ and MnSO$_4$ were mixed using distilled water from which dissolved oxygen was removed by bubbling with N2 for 24 hours to obtain compositions shown in Table 1. The solution was put into a reactor at 50° C. and NaOH and NH$_3$H$_2$O were used as a precipitating agent and a chelating agent, respectively, to perform a co-precipitation reaction for 48 hours to prepare active material precursors.

Mg(OH)$_2$, Ca(OH)$_2$, SrOH, and/or Ba(OH)$_2$ as an M1 source, Al(OH)$_2$ and/or ZrO$_2$ as an M2 source, and LiOH as a lithium source compound were further mixed to have compositions shown in Table 1 below and fired at 710° C. in a kiln to obtain cathode active materials containing lithium-nickel composite metal oxide particles. The compositions of the cathode active material are shown in Table 1 below.

Specifically, a content of each component of the cathode active material was analyzed using an ICP (Inductively Coupled Plasma).

Molar ratios in the lithium-nickel composite metal oxide particles obtained as the cathode active material are shown in Table 2 below (a molar ratio of oxygen was fixed to 2.0).

TABLE 11

| | ICP Analysis of Cathode Active Material (ppm) | | | | | | | | | | |
|---|---|---|---|---|---|---|---|---|---|---|---|
| | | | | | M2 | | | M1 | | | |
| | Li | Ni | Co | Mn | Al | Zr | Be | Mg | Ca | Sr | Ba |
| Example 1 | 77,110 | 503,115 | 59,224 | 61,183 | — | — | — | — | — | 3,000 | 2,000 |
| Example 2 | 75,748 | 511,933 | 57,593 | 60,823 | 2,000 | — | — | — | — | 3,000 | 2,000 |
| Example 3 | 72,578 | 508,941 | 67,184 | 33,992 | — | — | — | — | — | 2,000 | 1,000 |
| Example 4 | 72,578 | 508,941 | 67,184 | 33,992 | — | — | — | — | — | 4,000 | 2,000 |
| Example 5 | 72,743 | 503,116 | 66,581 | 33,390 | 3,000 | — | — | — | — | 2,000 | 1,000 |
| Example 6 | 72,261 | 539,523 | 55,358 | 15,221 | — | — | — | — | — | 500 | 500 |
| Example 7 | 71,707 | 532,069 | 54,884 | 14,762 | — | — | — | — | — | 1,000 | 1,000 |
| Example 8 | 71,877 | 535,918 | 55,122 | 14,829 | — | — | — | — | — | 3,000 | 1,500 |
| Example 9 | 72,711 | 539,153 | 55,484 | 14,906 | — | — | — | — | — | 5,000 | 1,500 |
| Example 10 | 71,414 | 533,950 | 54,912 | 14,688 | — | — | — | 500 | — | 5,000 | 1,500 |
| Example 11 | 71,599 | 534,057 | 54,907 | 14,748 | — | — | — | — | 500 | 5,000 | 1,500 |
| Example 12 | 72,272 | 539,790 | 55,857 | 15,182 | — | — | — | 500 | 500 | 5,000 | 1,500 |
| Example 13 | 70,909 | 534,452 | 55,055 | 14,757 | — | — | — | — | — | 3,000 | 1,500 |
| Example 14 | 71,819 | 536,065 | 55,087 | 14,746 | 3,000 | — | — | — | — | 3,000 | 1,500 |
| Example 15 | 72,121 | 537,388 | 55,194 | 14,867 | — | 3,000 | — | — | — | 3,000 | 1,500 |
| Example 16 | 71,917 | 536,407 | 55,158 | 14,856 | — | — | — | — | — | 3,000 | — |
| Example 17 | 71,784 | 537,636 | 55,043 | 14,781 | — | — | — | — | — | — | 2,000 |
| Example 18 | 76,309 | 604,835 | — | 14,985 | 3,000 | — | 0 | 0 | — | 3000 | 1500 |
| Comparative Example 1 | 73,214 | 496,785 | 56,773 | 61,387 | — | — | 12 | 20 | 10 | 8 | 2 |
| Comparative Example 2 | 77,955 | 521,322 | 56,974 | 61,030 | — | — | — | — | — | 7,000 | 7,000 |
| Comparative Example 3 | 72,472 | 505,125 | 66,825 | 33,812 | — | — | — | — | — | 9,000 | 6,000 |
| Comparative Example 4 | 72,721 | 539,191 | 55,039 | 15,115 | — | — | — | — | — | — | — |
| Comparative Example 5 | 74,214 | 375,865 | 118,962 | 124278 | — | — | — | — | — | — | — |
| Comparative Example 6 | 75,458 | 385,742 | 130,482 | 127010 | 1,600 | — | — | — | — | — | — |
| Comparative Example 7 | 74,807 | 385,052 | 129,989 | 119476 | — | — | — | 500 | — | 1,000 | 1,000 |
| Comparative Example 8 | 76,458 | 385,052 | 127,482 | 120541 | 1,600 | — | — | 500 | — | 1,000 | 1,000 |

TABLE 21

| | Lithium-Nickel composite metal oxide particle (molar ratio) | | | | | | | | | | | |
|---|---|---|---|---|---|---|---|---|---|---|---|---|
| | | | | | M2 | | | M1 | | | | |
| | Li | Ni | Co | Mn | Al | Zr | Be | Mg | Ca | Sr | Ba | M1 Total |
| Example 1 | 1.04 | 0.8 | 0.09 | 0.10 | — | — | — | — | — | 0.0032 | 0.0014 | 0.0046 |
| Example 2 | 1.00 | 0.8 | 0.09 | 0.10 | 0.007 | — | — | — | — | 0.0031 | 0.0013 | 0.0045 |
| Example 3 | 1.00 | 0.83 | 0.11 | 0.06 | — | — | — | — | — | 0.0022 | 0.0007 | 0.0029 |
| Example 4 | 1.00 | 0.83 | 0.11 | 0.06 | — | — | — | — | — | 0.0044 | 0.0014 | 0.0058 |
| Example 5 | 1.00 | 0.82 | 0.11 | 0.06 | 0.011 | — | — | — | — | 0.0022 | 0.0007 | 0.0029 |
| Example 6 | 1.00 | 0.88 | 0.09 | 0.03 | — | — | — | — | — | 0.0005 | 0.0003 | 0.0009 |
| Example 7 | 1.00 | 0.88 | 0.09 | 0.03 | — | — | — | — | — | 0.0011 | 0.0007 | 0.0018 |
| Example 8 | 1.01 | 0.89 | 0.09 | 0.03 | — | — | — | — | — | 0.0033 | 0.0011 | 0.0044 |
| Example 9 | 1.01 | 0.89 | 0.09 | 0.03 | — | — | — | — | — | 0.0055 | 0.0011 | 0.0066 |
| Example 10 | 1.00 | 0.88 | 0.09 | 0.03 | — | — | — | 0.0020 | — | 0.0055 | 0.0011 | 0.0086 |
| Example 11 | 1.00 | 0.88 | 0.09 | 0.03 | — | — | — | — | 0.0012 | 0.0055 | 0.0011 | 0.0078 |
| Example 12 | 1.01 | 0.89 | 0.09 | 0.03 | — | — | — | 0.0020 | 0.0012 | 0.0055 | 0.0011 | 0.0098 |
| Example 13 | 0.98 | 0.87 | 0.09 | 0.03 | — | — | — | — | — | 0.0033 | 0.0010 | 0.0043 |
| Example 14 | 1.01 | 0.89 | 0.09 | 0.03 | 0.011 | — | — | — | — | 0.0033 | 0.0011 | 0.0044 |
| Example 15 | 1.01 | 0.89 | 0.09 | 0.03 | — | 0.003 | — | — | — | 0.0033 | 0.0011 | 0.0044 |

TABLE 21-continued

| | Lithium-Nickel composite metal oxide particle (molar ratio) | | | | | | | | | | |
|---|---|---|---|---|---|---|---|---|---|---|---|
| | M2 | | | | | | M1 | | | | |
| | Li | Ni | Co | Mn | Al | Zr | Be | Mg | Ca | Sr | Ba | M1 Total |
| Example 16 | 1.01 | 0.89 | 0.09 | 0.03 | — | — | — | — | — | 0.0033 | | 0.0033 |
| Example 17 | 1.00 | 0.89 | 0.09 | 0.03 | — | — | — | — | — | | 0.0014 | 0.0014 |
| Example 18 | 1.02 | 0.96 | | 0.03 | 0.010 | — | 0 | — | — | 0.0032 | 0.0010 | 0.0042 |
| Comparative Example 1 | 1.00 | 0.8 | 0.09 | 0.11 | — | — | — | 0.0001 | — | 0 | 0 | 0.0001 |
| Comparative Example 2 | 1.01 | 0.8 | 0.09 | 0.10 | — | — | — | — | — | 0.0072 | 0.0046 | 0.0118 |
| Comparative Example 3 | 0.99 | 0.82 | 0.11 | 0.06 | — | — | — | — | — | 0.0098 | 0.0042 | 0.0139 |
| Comparative Example 4 | 1.00 | 0.88 | 0.09 | 0.03 | — | — | — | — | — | — | — | 0.0000 |
| Comparative Example 5 | 1.01 | 0.61 | 0.19 | 0.21 | — | — | — | — | — | — | — | — |
| Comparative Example 6 | 1.00 | 0.60 | 0.20 | 0.21 | 0.01 | — | — | — | — | — | — | — |
| Comparative Example 7 | 0.99 | 0.60 | 0.20 | 0.20 | — | — | — | 0.0019 | — | 0.0010 | 0.0007 | 0.036 |
| Comparative Example 8 | 1.01 | 0.60 | 0.20 | 0.20 | 0.01 | — | — | 0.0019 | — | 0.0010 | 0.0007 | 0.036 |

Table 3 below shows a value corresponding to 2.5 wt % of Ni (ppm) in each Examples and Comparative Examples and a percentage of a weight of M1 with respect to a weight of Ni (ppm) from the ICP analysis results.

TABLE 3

| | ICP Analysis of Cathode Active Material (ppm) | | | |
|---|---|---|---|---|
| | Content of Ni | Content of Ni × 2.5% (ppm) | Total M1 (ppm) | (M1 ppm/ Ni ppm) × 100 (%) |
| Example 1 | 503,115 | 12,578 | 5,000 | 1.00% |
| Example 2 | 511,933 | 12,798 | 5,000 | 1.00% |
| Example 3 | 508,941 | 12,724 | 3,000 | 0.60% |
| Example 4 | 508,941 | 12,724 | 6,000 | 1.20% |
| Example 5 | 503,116 | 12,578 | 3,000 | 0.60% |
| Example 6 | 539523 | 13,488 | 1,000 | 0.20% |
| Example 7 | 532069 | 13,302 | 2,000 | 0.40% |
| Example 8 | 535918 | 13,398 | 4,500 | 0.80% |
| Example 9 | 539153 | 13,479 | 6,500 | 1.20% |
| Example 10 | 533950 | 13,349 | 7,000 | 1.30% |
| Example 11 | 534057 | 13,351 | 7,000 | 1.30% |
| Example 12 | 539790 | 13,495 | 7,500 | 1.40% |
| Example 13 | 534452 | 13,361 | 4,500 | 0.80% |
| Example 14 | 536065 | 13,402 | 4,500 | 0.80% |
| Example 15 | 537388 | 13,435 | 4,500 | 0.80% |
| Example 16 | 536407 | 13,410 | 3,000 | 0.60% |
| Example 17 | 537636 | 13,441 | 2,000 | 0.40% |
| Example 18 | 604,835 | 15,121 | 4,500 | 0.70% |
| Comparative Example 1 | 496,785 | 12,420 | 52 | 0.00% |
| Comparative Example 2 | 521,322 | 13,033 | 14,000 | 2.70% |
| Comparative Example 3 | 505,125 | 12,628 | 15,000 | 3.00% |
| Comparative Example 4 | 539,191 | 13,480 | — | 0.00% |
| Comparative Example 5 | 375,865 | 9,397 | — | — |
| Comparative Example 6 | 385,742 | 9,644 | — | — |
| Comparative Example 7 | 385,052 | 9,626 | 2,500 | 0.649% |
| Comparative Example 8 | 385,052 | 9,626 | 2,500 | 0.649% |

(2) Fabrication of Secondary Battery

Secondary batteries were fabricated using the cathode active materials of Examples and Comparative Examples as shown in Table 1. Specifically, the cathode active material, Denka Black as a conductive material and PVDF as a binder were mixed in a mass ratio of 94:3:3 to prepare a cathode mixture, and then the cathode mixture was coated on an aluminum substrate, dried and pressed to prepare a cathode. An electrode density after the pressing was 3.5 g/cc or more.

93 wt % of natural graphite as an anode active material, 5 wt % of KS6 as a flake type conductive material, 1 wt % of styrene-butadiene rubber (SBR) as a binder, and 1 wt % of carboxymethyl cellulose (CMC) as a thickener were mixed to form an anode slurry. The anode slurry was coated on a copper substrate, dried and pressed to prepare an anode.

The cathode and the anode prepared as described above were each notched by a predetermined size, and stacked with a separator (polyethylene, thickness: 25 μm) interposed therebetween to form an electrode cell. Each tab portion of the cathode and the anode was welded. The welded cathode/separator/anode assembly was inserted in a pouch, and three sides of the pouch except for an electrolyte injection side were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by forming 1M $LiPF_6$ solution in a mixed solvent of ethylene carbonate (EC)/ethyl methyl carbonate (EMC)/diethylene carbonate (DEC) (25/45/30; volume ratio), and then 1 wt % of vinylene carbonate, 0.5 wt % of 1,3-propensultone (PRS) and 0.5 wt % of lithium bis(oxalato)borate (LiBOB) were added.

Experimental Example 1

(1) Structural Analysis

SEM Image Analysis

Figure 3:
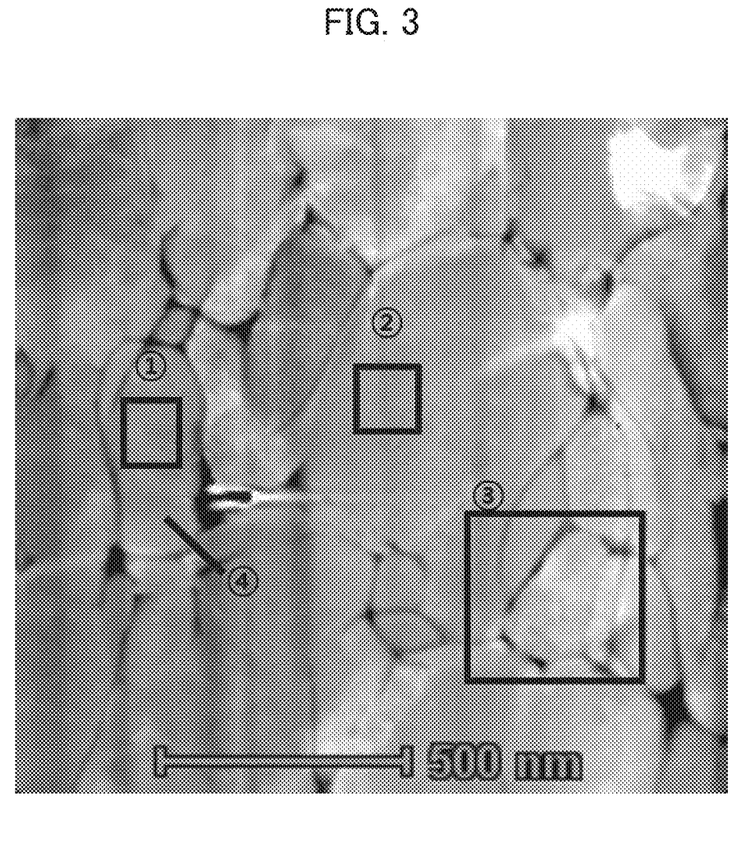
FIG. 3 is a scanning electron microscope (SEM) image showing a lithium-nickel composite metal oxide particle in accordance with exemplary embodiments.

FIG. 3 is a scanning electron microscope (SEM) image showing a cross-section of a lithium-nickel composite metal oxide particle of Example 13.

Referring to FIG. 3, the cathode active material for a lithium secondary battery was formed to have a secondary particle structure in which primary particles were aggregated.

EDS Analysis and XPS Analysis

Figure 4A:
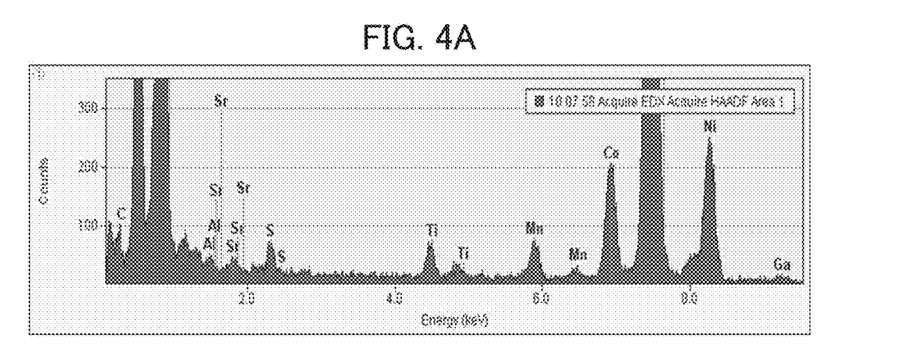
FIGS. 4A to 4C are graphs showing results of an energy dispersive X-ray (EDX) analysis at regions designated as ① to ③ in FIG. 3.
Figure 4B:
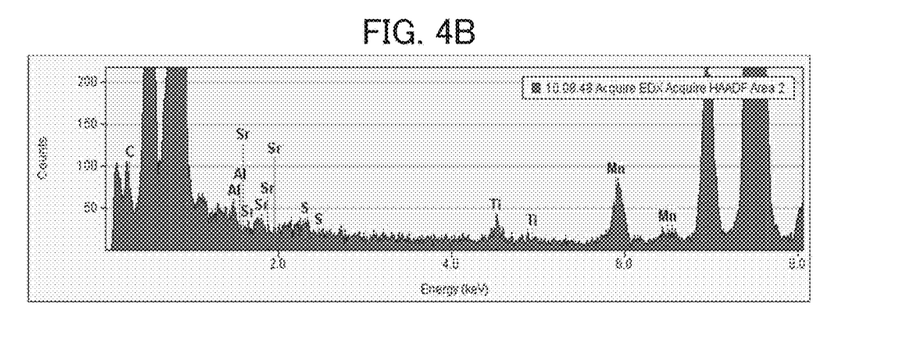
Figure 4C:
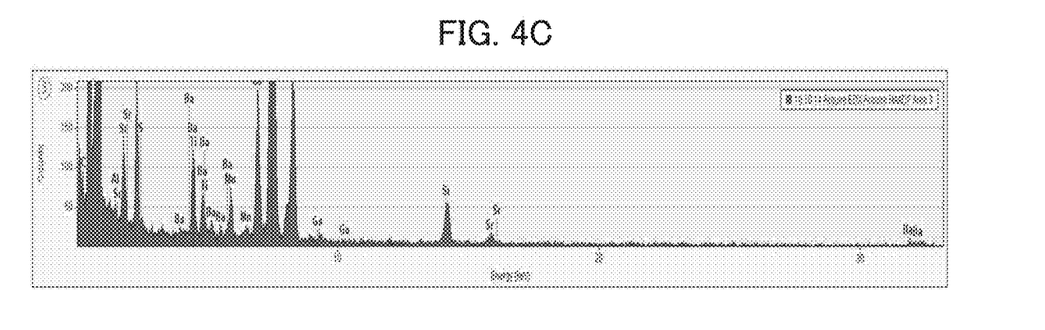

FIGS. 4A to 4C are graphs showing results of an energy dispersive X-ray (EDX) analysis at box regions designated as ①  to ③ in FIG. 3 to measure contents of components in the lithium-nickel composite metal oxide according to an energy.

Referring to FIGS. 4A to 4C, it can be confirmed that the cathode active material according to exemplary embodiments of the present invention included the lithium-nickel composite metal oxide particle having a transition metal element M1 (Mn, Co) and an element M2 having an oxidation number of +2.

Figure 5A:
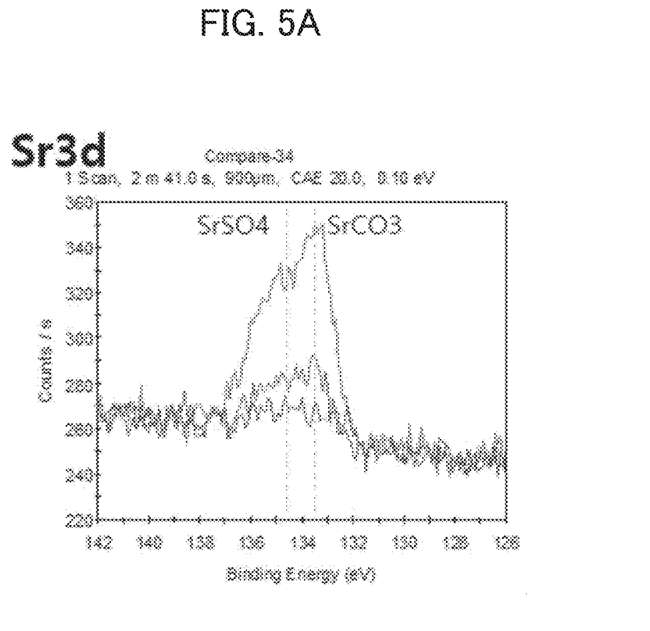
FIGS. 5A and 5B are X-ray photoelectron spectroscopy (XPS) graphs at a region designated as ④ in FIG. 3.
Figure 5B:
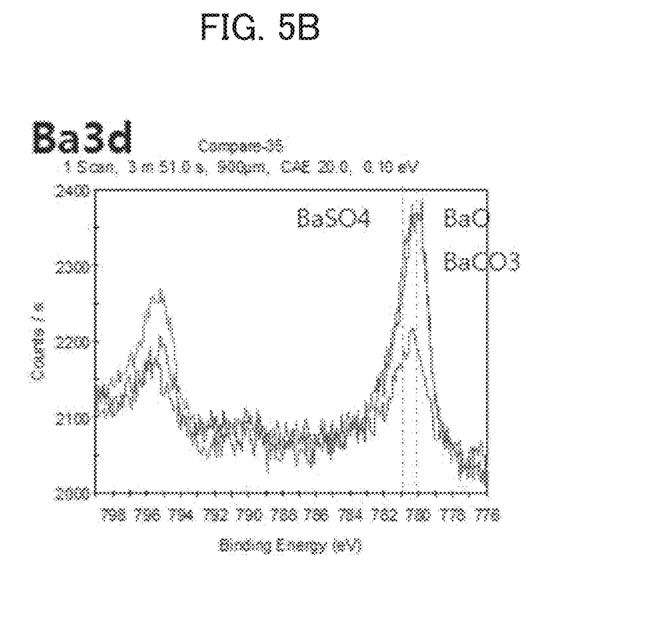

FIGS. 5A and 5B are X-ray photoelectron spectroscopy (XPS) graphs at a region designated as ④ in FIG. 3.

Referring to FIG. 5A, it can be confirmed that an Sr sulfate component and an Sr carbonate component were present between the adjacent primary particles.

Referring to FIG. 5B, it can be confirmed that a Ba sulfate component, a Ba carbonate component and a Ba oxide component were present between the adjacent primary particles.

Experimental Example 2

(1) Measurement of Initial Resistance and Initial Discharge Capacity

After charging (CC-CV 0.1 C 4.3V 0.005 C CUT-OFF) the lithium secondary batteries prepared according to Examples and Comparative Examples in a chamber at 25° C., a battery capacity (initial charge capacity) was measured. The batteries were discharged again (CC 0.1 C 3.0V CUT-OFF) and then a battery capacity (initial discharge capacity) was measured.

(2) Measurement of Capacity Retention (Life-Span Property) During Repeated Charging and Discharging 120 cycles of charging (CC/CV 0.5 C 4.3V 0.05 C CUT-OFF) and discharging (CC 1.0 C 3.0V CUT-OFF) at 45° C. were repeated for the lithium secondary batteries according to Examples and Comparative Examples. A discharge capacity retention was evaluated as a percentage of a value obtained by dividing the discharge capacity at the 120th cycle by the discharge capacity at the first cycle.

The evaluation results are shown in Table 4 below.

TABLE 4

| | Initial Resistance DC-IR (mOhms) | Initial Discharge Capacity (mAh/g) | Discharge Capacity Retention at 45° C. (%) |
|---|---|---|---|
| Example 1 | 4.14 | 187 | 96.4 |
| Example 2 | 4.08 | 189 | 96.7 |
| Example 3 | 4.26 | 193 | 94.9 |
| Example 4 | 4.26 | 193 | 94.9 |
| Example 5 | 4.27 | 193 | 95.7 |
| Example 6 | 3.98 | 194 | 92.8 |
| Example 7 | 4.57 | 201 | 93.8 |
| Example 8 | 4.44 | 201 | 94.5 |
| Example 9 | 4.38 | 202 | 94.2 |
| Example 10 | 4.02 | 194 | 93.9 |
| Example 11 | 4.37 | 201 | 94.8 |
| Example 12 | 4.44 | 201 | 94.5 |
| Example 13 | 4.38 | 202 | 94 |
| Example 14 | 4.6 | 201 | 94.7 |
| Example 15 | 4.46 | 201 | 94.5 |
| Example 16 | 4.5 | 201 | 94.5 |
| Example 17 | 4.72 | 201 | 93.5 |
| Example 18 | 4.89 | 215 | 88.1 |
| Comparative Example 1 | 3.86 | 189 | 92.9 |
| Comparative Example 2 | 5.32 | 142 | 99.5 |
| Comparative Example 3 | 7.25 | 158 | 97.3 |
| Comparative Example 4 | 4.07 | 194 | 87.8 |
| Comparative Example 5 | 3.54 | 178 | 98.7 |
| Comparative Example 6 | 3.72 | 175 | 98.5 |
| Comparative Example 7 | 3.60 | 178 | 98.5 |
| Comparative Example 8 | 3.75 | 175 | 98.4 |

Referring to Table 4, the lithium secondary battery including the lithium-nickel composite metal oxide having a composition of M1 in the range according to exemplary embodiments of the present invention as a cathode active material particle provided remarkably improved initial resistance, initial discharge capacity and discharge capacity retention compared to the case in which M1 was not included or was excessively added.

Referring to Comparative Examples 5 to 8, when the content of nickel included in the lithium nickel composite metal oxide was less than 0.8 mol %, any significant change in the initial resistance, initial discharge capacity and discharge capacity retention was not observed regardless of whether M1 was included or not.

What is claimed is:

1. A cathode active material for a lithium secondary battery, comprising:
a lithium-nickel composite metal oxide particle represented by Chemical Formula 1 and having a secondary particle structure in which a plurality of primary particles are aggregated; and
at least one of a metal sulfate component, a metal carbonate component and a metal oxide component which is present between the primary particles in an inner region of the lithium-nickel composite metal oxide particle,
wherein the metal sulfate component, the metal carbonate component and the metal oxide component each contains M1 in Chemical Formula 1:

[Chemical Formula 1]

$Li_aNi_xM1_yM2_{1-x}O_b$ wherein, in Chemical Formula 1, 0<a≤1.1, 1.98≤b≤2.2, 0.8≤x<0.98, y is a molar ratio of M1 corresponding to a weight greater than 0 wt % and 2.5 wt % or less of a weight of Ni,
M1 is at least one element selected from the group consisting of Sr and Ra, and M1 is present between the primary particles in the inner region of the secondary particle structure of the lithium-nickel composite metal oxide particle, and
M2 includes Mn and Co,
wherein the cathode active material is made by:
preparing an active material precursor obtained by mixing and reacting active material metal salts;

mixing the active material precursor, a sulfate remaining from the preparation of the active material precursor, M1 source and a lithium source; and reacting the active material precursor, remaining sulfates, M1 source and a lithium source by a heat treatment to form the at least one of the metal sulfate component, the metal carbonate component or the metal oxide component present between the primary particles in the inner region of the lithium-nickel composite metal oxide particle.

2. The cathode active material for a lithium secondary battery according to claim 1, wherein a weight ratio of M1 is from 0.01 wt % to 1.4 wt % based on the weight of Ni.

3. The cathode active material for a lithium secondary battery according to claim 1, wherein, in Chemical Formula 1, $0.0002 \leq y \leq 0.02$.

4. The cathode active material for a lithium secondary battery according to claim 1, wherein, in Chemical Formula 1, $0.001 \leq y \leq 0.01$.

5. The cathode active material for a lithium secondary battery according to claim 1, wherein, in Chemical Formula 1, M2 further comprises at least one element selected from the group consisting of B, Al, Si, Ti, V, Fe, Cu, Zn, Y, Zr, Mo, Sn and W.

6. The cathode active material for a lithium secondary battery according to claim 1, wherein, in Chemical Formula 1, $0.8 \leq x \leq 0.95$.

7. A lithium secondary battery, comprising:
a cathode comprising the cathode active material layer for a lithium secondary battery of claim 1; and
an anode facing the cathode.

\* \* \* \* \*